US009060464B2

(12) United States Patent
Horton et al.

(10) Patent No.: US 9,060,464 B2
(45) Date of Patent: Jun. 23, 2015

(54) METHOD AND APPARATUS FOR DREDGING AND REMOVING AQUATIC VEGETATION

(71) Applicant: Liquid Waste Technology, LLC, New Richmond, WI (US)

(72) Inventors: Ryan Patrick Horton, Kansas City, MO (US); Michael Todd Young, Bonner Springs, KS (US)

(73) Assignee: LIQUID WASTE TECHNOLOGY, LLC, New Richmond, WI (US)

( * ) Notice: Subject to any disclaimer, the term of this patent is extended or adjusted under 35 U.S.C. 154(b) by 72 days.

(21) Appl. No.: 14/014,246

(22) Filed: Aug. 29, 2013

(65) Prior Publication Data

US 2014/0069071 A1    Mar. 13, 2014

Related U.S. Application Data

(60) Provisional application No. 61/698,476, filed on Sep. 7, 2012, provisional application No. 61/735,905, filed on Dec. 11, 2012, provisional application No. 61/803,744, filed on Mar. 20, 2013.

(51) Int. Cl.
*A01D 44/00* (2006.01)

(52) U.S. Cl.
CPC ..................... *A01D 44/00* (2013.01)

(58) Field of Classification Search
CPC ........ A01D 44/00; E02B 15/04; B63B 35/00; B63B 35/32
USPC ........ 56/8, 9, 328.1, 16.2, 156, 251; 460/111, 460/112; 241/285.2, 605
See application file for complete search history.

(56) References Cited

U.S. PATENT DOCUMENTS

| | | | |
|---|---|---|---|
| 669,820 A | 3/1901 | Christen |
| 1,028,671 A | 6/1912 | Brooks |
| 1,795,003 A | 3/1931 | Allen |
| 2,223,641 A | 12/1940 | Sanger |
| 2,486,275 A | 10/1949 | Grinwald |
| 2,635,406 A | 4/1953 | Chauvin |
| 2,702,975 A | 3/1955 | Friesen |
| 3,238,708 A | 3/1966 | Zickefoose |
| 3,407,577 A | 10/1968 | Fiske |
| 3,468,106 A | 9/1969 | Myers |
| 3,653,192 A | 4/1972 | Bryant |
| 4,070,978 A | 1/1978 | Virgilio |
| 4,095,545 A | 6/1978 | Vaughn |
| 4,196,566 A | 4/1980 | Donnelley |

(Continued)

*Primary Examiner* — Robert Pezzuto
(74) *Attorney, Agent, or Firm* — Hovey Williams LLP

(57) ABSTRACT

A method and apparatus for dredging sediment from aquatic environments and cutting aquatic vegetation therein includes using a cutterhead mounted to a dredge. The cutterhead may be mounted to a shroud, the cutterhead including a rotating drum having an array of teeth assemblies which auger cut vegetation toward a port in the shroud for discharge via a pump. The shroud also includes stationary cutterbars having cutterbar teeth assemblies. The teeth assemblies preferably include back-to-back tooth pairs wherein individual teeth have a flat backside and a raised or convex front side which may be provided with serrated cutting margins. Using back-to-back tooth pairs enables cutting of more types and sizes of aquatic vegetation, reducing downtime due to clogging, bending or breakage versus conventional single teeth cutterheads. The shroud may include an upwardly and/or forwardly extending shield along its top front edge to deflect water and/or vegetation back toward the drum.

43 Claims, 9 Drawing Sheets

(56) References Cited

U.S. PATENT DOCUMENTS

| | | |
|---|---|---|
| 4,205,507 A | 6/1980 | McClure |
| 4,248,033 A | 2/1981 | Bryant |
| 4,416,106 A | 11/1983 | Hawk |
| 4,616,588 A | 10/1986 | Caddick |
| 4,815,260 A | 3/1989 | Desrosiers |
| 5,481,856 A | 1/1996 | Wickoren et al. |
| 7,555,889 B2 * | 7/2009 | Priesnitz et al. .............. 56/504 |
| 8,333,056 B2 * | 12/2012 | Syverson et al. .................. 56/8 |
| 8,479,481 B2 * | 7/2013 | O'Toole et al. ..................... 56/8 |
| 2002/0107056 A1 * | 8/2002 | VanEe ........................... 460/112 |

* cited by examiner

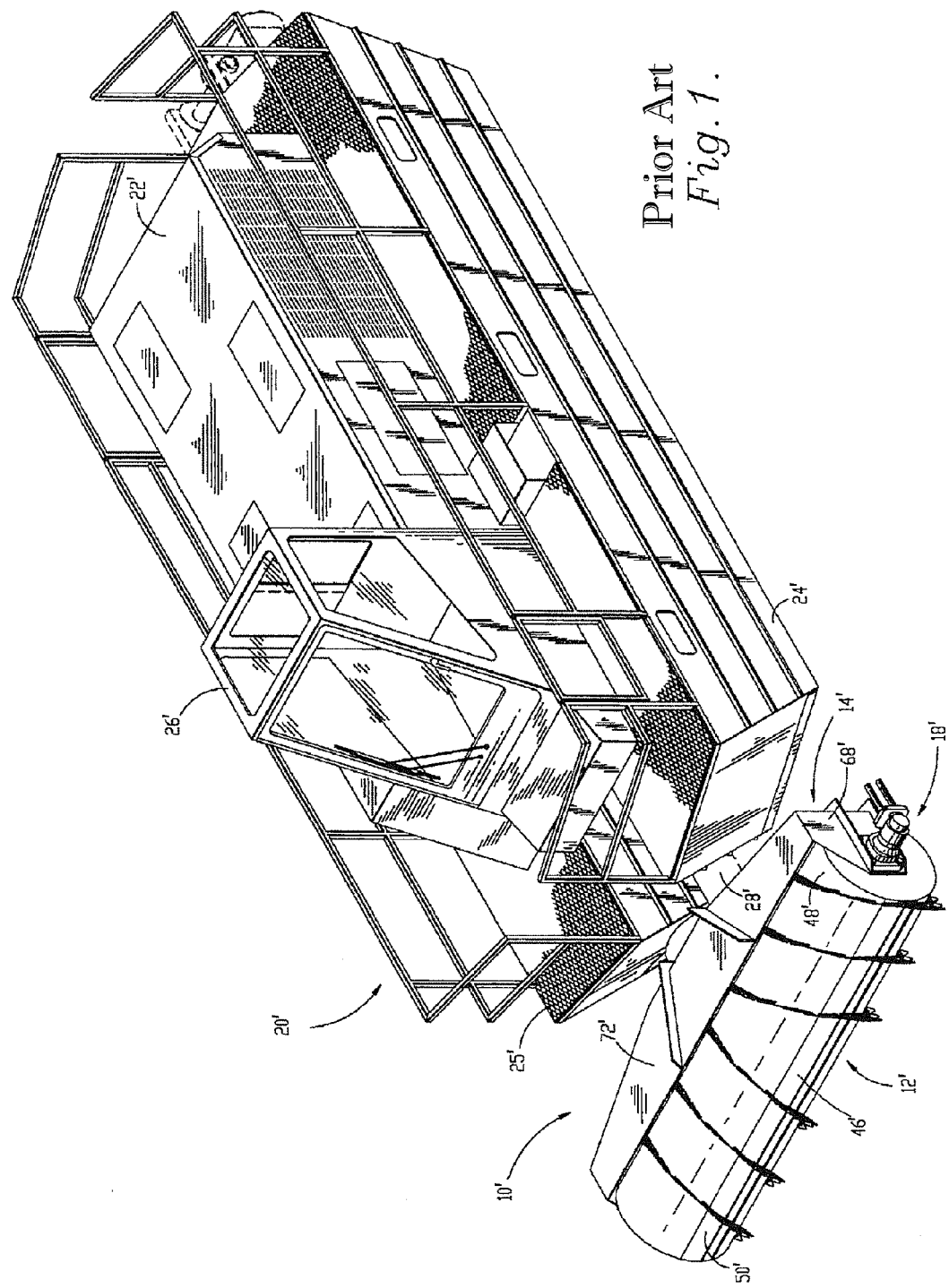

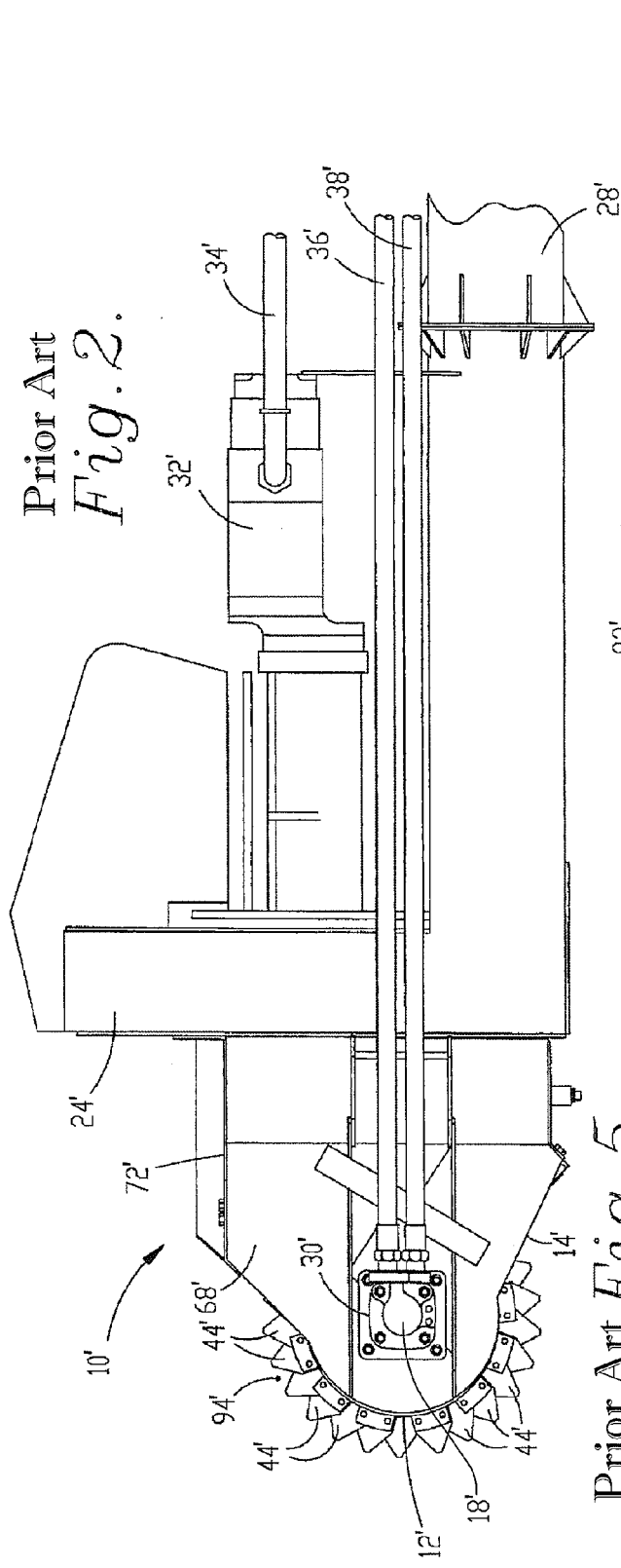
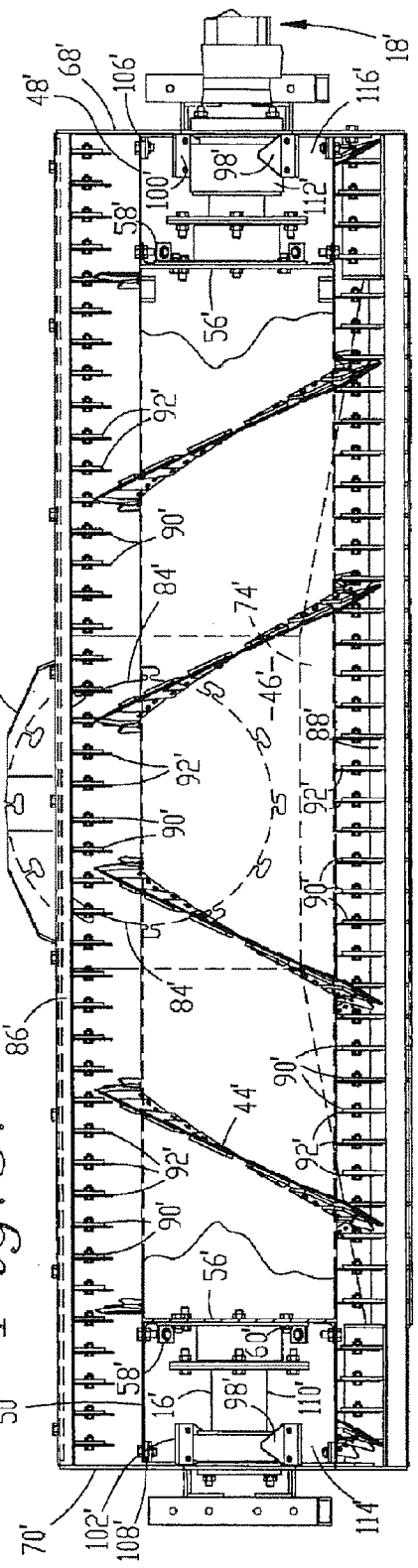
Prior Art Fig. 2.
Prior Art Fig. 5.

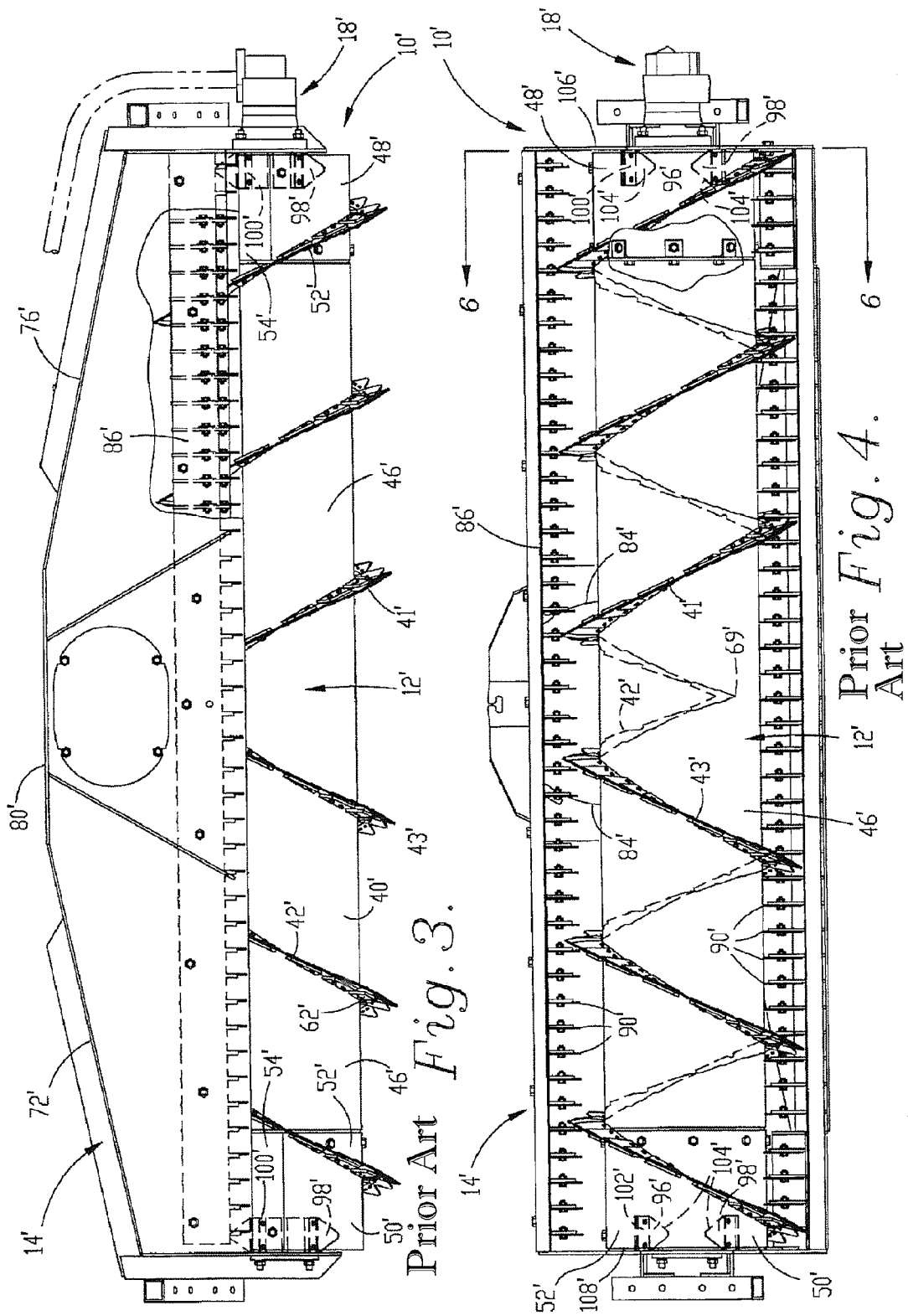

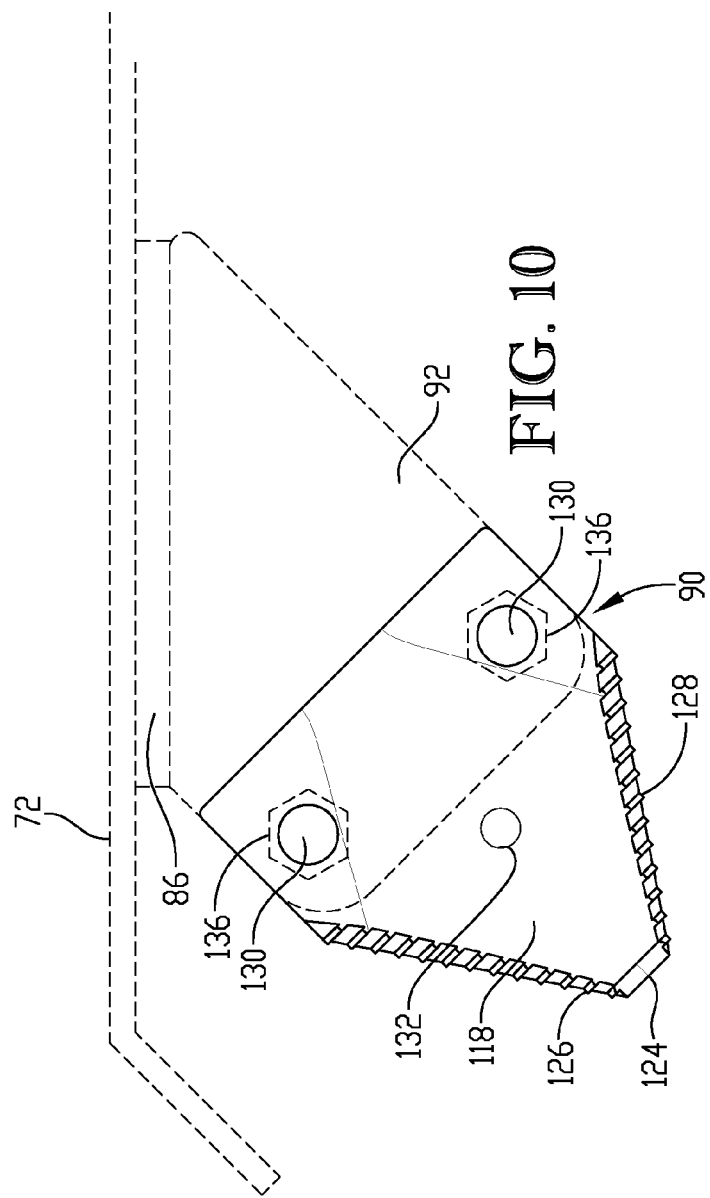
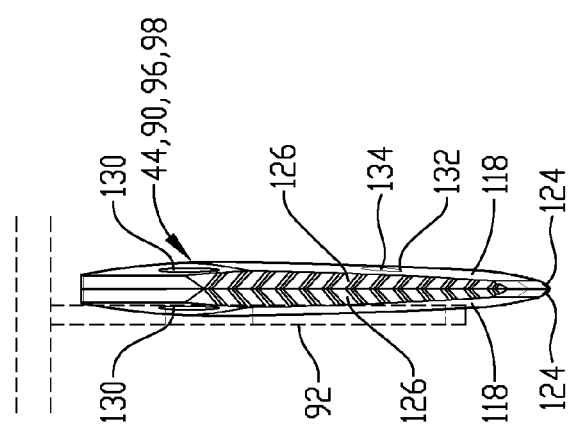

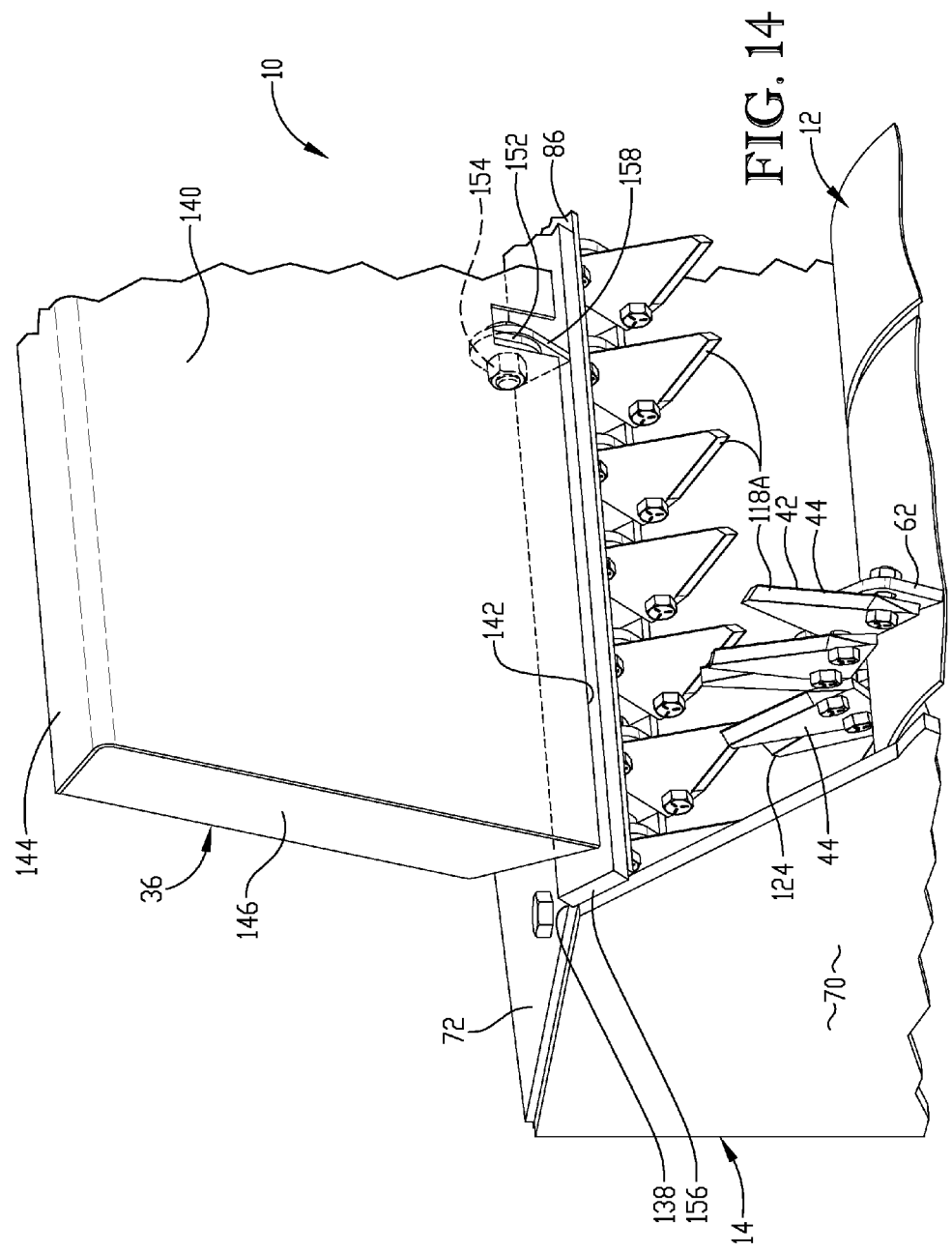

METHOD AND APPARATUS FOR DREDGING AND REMOVING AQUATIC VEGETATION

This application claims the benefit of U.S. Provisional Patent Application No. 61/698,476 filed Sep. 7, 2012, U.S. Provisional Patent Application No. 61/735,905 filed Dec. 11, 2012, and U.S. Provisional Patent Application No. 61/803,744 filed Mar. 20, 2013, the entire disclosures of which are incorporated hereby by reference.

BACKGROUND OF THE INVENTION

1. Field of the Invention

This invention broadly concerns a cutterhead and associated method for cutting weeds and other aquatic vegetation which cuts the weeds using angled teeth mounted to a rotating drum. More particularly, the cutterhead hereof provides a tearing action which also directs the cut vegetation and any sediment into a pump for removal to a remote site, utilizing an improved teeth arrangement employing double, back-to-back cutting teeth.

2. Description of the Prior Art

Many types of dredging operations encounter weeds or massed vegetation which has grown on sludge deposited in lagoons, in channels, or in other waters where removal is periodically required. Often the weeds or other aquatic vegetation represents an impediment to the removal of the underlying sludge, sand, silt or other deposits, because of the clogging effect of the vegetation. Cattails and plants with longs stems and gnarly roots often grow in sediment lagoons and in channels, and when the sediment is to be removed during dredging, these plants are especially tenacious and prone to cause clogging of the pumps. Moreover, they tend to wrap around many types of cutterheads typically used for clearing sediment. The entire dredging head must then be removed so that the plants can be cut away from the cutterhead. Thus, dredging in areas which have a large amount of aquatic vegetation represents one of the most difficult environs for sediment removal.

Many different types of apparatus have been used for cutting and removing aquatic vegetation. Exemplary devices of the prior art are shown in U.S. Pat. Nos. 669,820; 1,028,671; 1,795,003; 2,223,641; 2,486,275; 2,635,406; 2,702,975; 3,238,708; 3,407,577; 3,468,106; 3,653,192; 4,070,978; 4,095,545; 4,196,566; 4,205,507; 4,416,106; 4,248,033; 4,616,588; and 4,815,260. Unfortunately, none of these devices have solved the problems associated with wrapping of the plants around the cutterhead, nor have they adequately worked with the pumping system to remove the cut vegetation and the sediment to be removed.

An improvement to existing cutterheads is also shown in U.S. Pat. No. 5,481,856, the entire disclosure of which is incorporated herein by reference. However, the cutterhead of U.S. Pat. No. 5,481,856 utilized single, flat-sided teeth which broke, folded or clogged when attempting to dredge and cut particularly tough aquatic vegetation such as reeds, cattails or tussiks. Furthermore, the prior cutterheads have experienced deficiencies when cutting and harvesting aquatic vegetation at the surface of a body of water resulting from temporary loss of liquid and solid intake resulting in starvation of the pump. Such pump starvation causes loss of pump prime and the necessity to stop harvesting until the pump is reprimed.

Accordingly, there has developed a need for a weed-resistant cutterhead for use in aquatic environments, such as ponds, lakes, canals and waterways, which is capable of removing sediment and vegetation in plant-clogged areas.

There has also developed a real need for a cutterhead which is resistant to wrapping of long plant growth around the ends of a rotatable drum or reel.

There has also developed a need for a cutterhead which can direct the sediment and cut vegetation to an outlet port for pumping to a remote location.

There is a further need for a cutterhead having improved capabilities for harvesting vegetation at the surface of a body of water.

SUMMARY OF THE INVENTION

These and other objects are largely met by the cutterhead and method of harvesting aquatic vegetation of the present invention. That is to say, the cutterhead of the present invention is intended to operate underwater and at the surface of a body of water as well, and is more resistant to clogging or breakage than the prior art. It cooperatively removes sedimentation and cuts aquatic vegetation, and may be used in a variety of aquatic environments.

The invention hereof broadly includes a drum mounted for rotation and carrying a plurality of teeth assemblies, and a shroud which is provided with at least one cutterbar with teeth assemblies arranged in a tearing relationship with the drum mounted teeth assemblies to cut, writhe and rend vegetation which undesirably wraps around the drum or drapes across the drum teeth assemblies. The shroud may be provided with a port for passing the material cut by the drum to a pump or pipe for passage to a remote site. The drum mounted teeth assemblies are preferably arrayed whereby they effectively operate not only to cut the plant material but also pass the cut vegetation along the drum in the manner of an auger during rotation. Further, the teeth assemblies are preferably oriented whereby the stationary teeth assemblies on the cutterbars pass through gaps at the points of the rotating drum mounted teeth assemblies during rotation to effect more complete cutting and a self-cleaning action. The teeth assemblies are provided as pairs of individual teeth members, each of the individual teeth members preferably having a substantially flat back side and a raised, somewhat convex front side and a cutting margin which most preferably includes a pair of serrated edges which intersect at a point. More preferably, the teeth assemblies are provided as back-to-back pairs of individual teeth members which have been welded to one another, most preferably by plug welding.

Most preferably, the shroud for the cutterhead of the present invention may be provided with upper and lower stationary cutterbars for enhanced tearing action with the rotating drum-mounted teeth, whereby the stationary teeth assemblies may be suitably spaced for maintenance while providing enhanced transverse coverage to clear vegetation between the points of the drum-mounted teeth assemblies. In especially preferred embodiments, the cutterhead hereof may include teeth assemblies mounted adjacent the ends of the drum and projecting outwardly from the drum's axis of rotation to cut vegetation which may pass between the drum and the shroud and otherwise wrap around the shaft or hub rotatably carrying the drum. Because aquatic vegetation may pass through even tight tolerances, the inclusion of these outwardly projecting teeth assemblies enhances the operation of the drum by severing lengthy strings of plant material which would otherwise wrap around the shaft or hub.

Preferably, while dredging silt, sand and clay, a conventional dredge cutterhead should be utilized. The cutterhead of the present invention may be most effectively directed into dense plant growth on submerged sediment deposits and simultaneously remove the sediment and cut plant stalks and root masses. The cutterhead hereof continues to be effective in removing sediment deposits after the plant material has been cut away, most preferably completely. Thus, optimal operating effectiveness and efficiency may be seen when the operator replaces the cutterhead of the present invention with a conventional dredge cutterhead once the weed cover on a lake, canal or other body of water is removed, as such conventional dredge cutterheads are more abrasive resistant and will last longer without maintenance in sand and coarse sediment environments.

The cutterhead of the present invention may be provided with a shield which extends forwardly of a top edge of the cutterhead shroud with respect to the direction of movement of the cutterhead. By positioning such a shield at the top of the cutterhead shroud, several disadvantages of prior cutterheads have been overcome. The shield effectively blocks displacement of much water and cut vegetation from passing over the upper surface of the cutterhead shroud. By the provision of the shield, water and vegetation is directed back into the path of the cutterhead, yielding advantages not previously contemplated. For example, when the cutterhead is operating at or near the surface of a body of water, the shield helps to avoid pump starvation when too little liquid and cut vegetation enters the slurry pump, and thus more consistent and continuous operation is achieved, which is lost when the forward movement of the cutterhead must be stopped and the cutterhead lowered to again achieve a satisfactory priming of the pump and constant liquid flow during harvesting operations. Another advantage which may be obtained by the use of the shield is to direct the cut vegetation back into the cutterhead so that it may be pumped and moved to a remote location. It is desirable to remove as much vegetation from a body of water as possible because many species of aquatic vegetation are self-propagating. By inhibiting the passage of cut vegetation over the top of the cutterhead when the cutterhead is operating at the surface of a body of water, more cut vegetation is directed into the interior of the shroud and pumped to a remote location.

In particularly preferred embodiments, the shield is adjustably mounted to the top front edge of the shroud so that its angle relative to the shroud may be changed. In this way, the angle that vegetation enters the cutterhead may be changed and more vegetation may be directed into the cutterhead for harvesting. Preferably, the shield may be adjustably positioned through a range of angles between about 0° or parallel to the top of the cutterhead shroud, to about 90° or perpendicular to a plane along the top of the cutterhead shroud. For example, in cutting taller rooted vegetation, it is desirable to push the top of the vegetation away from the head and start cutting up the vegetation from the bottom or lower portion of the plant. The adjustable shield helps to accomplish this by positioning the shield at an angle of between about 30° to 40° from a plane extending forwardly along the top surface of the shroud, allowing for better operational efficiency. For entangled vegetation which is lower in height or vegetation that grows runners, the shield may be pivoted to a position closer to about 90° from a plane extending along the top surface of the shroud so that more of the vegetation can get processed by the cutting teeth and pull itself and adjoining plants into the cutterhead. In either position, the shield helps prevent the vegetation from getting behind the cutting head and between pontoons or into the hull area of the vessel performing the harvesting operations, which can interfere with raising and lowering a ladder or arms, or can entangle in propulsion systems.

In one embodiment, the cutterhead of the present invention may include a first stationary cutterbar having a first set of spaced-apart cutterbar teeth assemblies mounted therealong and a second stationary cutterbar having a second set of spaced-apart cutterbar teeth assemblies mounted therealong, with the first and second stationary cutterbars mounted on a cutterhead shroud. This embodiment may further include a drum rotatably mounted proximate the cutterhead shroud, the drum having a substantially smooth drum surface and presenting a plurality of radially projecting drum teeth assemblies therealong, and having means for rotatably mounting the drum proximate the cutterheads. Also included are means mounting the drum teeth assemblies so as to present gaps between the points thereof, whereby some of the drum teeth assemblies pass closely adjacent the first set of cutterbar teeth assemblies in tearing relationship thereto and others of the drum teeth assemblies pass closely adjacent the second set of cutterbar teeth assemblies, in tearing relationship thereto, during rotation of said drum. In this embodiments, the drum teeth assemblies may also include a first tooth and a second tooth, each of the teeth having a flat back, a raised front and a cutting margin, the first and second teeth being mounted in back-to-back arrangement whereby their cutting margins are adjacent and the backs are substantially co-planar.

In another embodiment, the present invention of cutting aquatic vegetation may include a cutterhead shroud having an port for passing cut vegetation therethrough, a drum and means mounting the drum for rotation relative to said shroud, a motor for rotating the drum, and an array of drum teeth assemblies projecting radially from the drum, the array being of a substantially helical configuration about the drum for promoting movement of the cut vegetation to the port during rotation of said drum, wherein the drum teeth assemblies include a first tooth and a second tooth, each of the teeth having a flat back, a raised front and a cutting margin, the first and second teeth being mounted in back-to-back arrangement whereby their cutting margins are adjacent and the backs are substantially co-planar.

In yet another embodiment, the cutterhead of the present invention may include a first stationary cutterbar presenting a first set of spaced-apart cutterbar teeth assemblies mounted therealong, a second stationary cutterbar presenting a second set of spaced-apart cutterbar teeth assemblies mounted therealong, and a cutterhead shroud mounting the first and second stationary cutterbars. This embodiment may further include a drum rotatably mounted proximate the cutterhead shroud, the drum having a substantially smooth drum surface and presenting a plurality of radially projecting drum teeth assemblies therealong, and means rotatably mounting the drum proximate the cutterheads. This embodiment may also include means mounting the drum teeth assemblies to present gaps between the points thereof whereby some of the drum teeth assemblies pass closely adjacent said the set of cutterbar teeth assemblies in tearing relationship thereto, and others of the drum teeth assemblies pass closely adjacent the second set of cutterbar teeth assemblies in tearing relationship thereto during rotation of the drum. Further, this embodiment may include a shield mounted to the cutterhead shroud and extending forwardly and/or upwardly from a top front edge of the cutterhead shroud.

In a further embodiment, the present invention includes a method for cutting aquatic vegetation. That method can include the steps of providing a dredge having a pump and means for conveying cut vegetation from the pump, the pump mounting a cutterhead having a shroud and a drum, the drum having a substantially helical array of drum teeth assemblies, the teeth assemblies including a first tooth and a second tooth, each of the teeth having a flat back, a raised front and a cutting margin, the first and second teeth being mounted in back-toback arrangement whereby their cutting margins are adjacent and the backs are substantially co-planar, and the shroud having at least one stationary cutterbar presenting a plurality of cutterbar teeth assemblies, at least some of the cutterbar teeth assemblies being oriented in vegetation tearing relationship to the drum when the drum is rotated relative to the shroud, with the shroud further including a port for passing cut vegetation to the pump; placing the cutterhead in engagement with aquatic vegetation; rotating the drum to cut the vegetation; moving the vegetation transversely along the drum by augering action of the helical array of teeth; and passing the vegetation through the port and into the pump.

In a still further embodiment, the present invention includes a method for cutting aquatic vegetation, wherein the method includes the steps of providing a dredge including a pump and means for conveying cut vegetation from the pump, the pump mounting a cutterhead having a shroud and a drum, the drum presenting a substantially helical array of drum teeth assemblies, the shroud having at least one stationary cutterbar presenting a plurality of cutterbar teeth assemblies, at least some of the cutterbar teeth assemblies being oriented in vegetation tearing relationship to the drum when the drum is rotated relative to the shroud, the shroud further including a port for passing cut vegetation to the pump, and a shield extending upwardly and/or forwardly of a top front edge of the shroud; placing the cutterhead in engagement with aquatic vegetation; rotating the drum to cut the vegetation; moving said vegetation transversely along said drum by augering action of said helical array of teeth; deflecting water and/or vegetation contacting the shield towards the rotating drum; and passing the vegetation through the port and into the pump.

These and other advantages of the cutterhead and method of the present invention will be evident to those skilled in the art with reference to the drawings and the detailed discussion which follows.

BRIEF DESCRIPTION OF THE DRAWINGS

FIG. 1 is a perspective view of a prior art cutterhead mounted on a boom connected to a dredge;

FIG. 2 is an enlarged fragmentary side elevational view showing the prior art cutterhead of FIG. 1 coupled to a pump and motor for passing the cut vegetation through the boom;

FIG. 3 is an enlarged top plan view of the prior art cutterhead drum and shroud of FIG. 1, with a portion of the shroud broken away to show an upper cutterbar and its teeth assemblies, the remainder of which is shown in phantom;

FIG. 4 is an enlarged front elevational view showing the prior art drum and shroud of FIG. 1, with portions of one of the drum end halves removed to show the drum end mounting arrangement, and with some of the teeth assemblies shown in phantom;

FIG. 5 is an enlarged front elevational view of the prior art drum and shroud of FIG. 4 showing the port through the shroud in phantom, and portions of the drum end halves removed to show the shaft and motor for rotating the drum;

FIG. 9 is an enlarged, front end view of one of the teeth assemblies of FIG. 8, showing a flange of a cutterbar in broken lines, and with the mounting bolts and nuts removed for clarity to show the configuration of the teeth assemblies and one of the serrated cutting edges;

FIG. 10 is an enlarged, elevational view of a cutterbar teeth assembly of the present invention with the mounting nut and flange shown in broken lines, to show the mounting arrangement of one of the teeth assemblies;

FIG. 14 is an enlarged top left front perspective view of a section of the cutterhead shown in FIG. 11, showing in detail the relative positioning of cutterhead teeth assemblies, and one of the pivot mounts which permit adjustment of the shield relative to the cutterhead shroud.

DESCRIPTION OF THE PREFERRED EMBODIMENT

Referring now to FIGS. 1-6, a cutterhead 10' broadly includes a rotatably mounted drum 12', a shroud 14', drum mounting structure 16' and motor 18'. The cutterhead 10' is used in conjunction with a dredge 20' which includes engine compartment 22', pontoon hull 24', deck 25', cab 26', and a boom 28' pivotally mounted at the rear of the dredge. As shown in greater detail in FIG. 2, the boom 28' carries a pump 30' and pump motor 32' for operating the impeller located within the pump 30' and which receives material from the shroud 14' for delivery through the boom 28' to a remote location. The pump motor 32' and the motor 18' are both preferably hydraulically driven by hydraulic fluid under pressure by power supplied by a hydraulic pump in the engine compartment 22' and delivered through hydraulic conduits 34' (to pump motor), 36' and 38' (to motor 18').

In greater detail, the drum 12' is substantially cylindrical and presents a smooth outer surface 40' with the exception of an array 42' of spirally oriented, convergent patterned, radially projecting drum teeth assemblies 44'. The drum 12' is preferably made of mild steel which provides sufficient strength and durability, while the teeth assemblies 44' are hardened to cut aquatic vegetation encountered during dredging while at the same time withstanding impacts from rocks or other debris which may have settled into the sediment or other deposit to be dredged.

Turning next to FIGS. 3 and 4, the drum 12' includes a center section 46' and a pair of end sections 48' and 50', each including a pair of end halves 52' and 54'. The center section includes an end wall 56' at each longitudinal end, and a plurality of circumferentially spaced mounting flanges 58' which project longitudinally at each end and include nuts 60' welded thereto for receiving bolts which project through the surfaces of the end halves 52' and 54' and are threaded into the nuts. This enables easy removal of the end halves 52' and 54' for access to the drum mounting structure 16'. As is easily seen in FIGS. 3 and 4, the array 42' extends through the end sections 48' and 50' whereby the spiral orientation of the array 42' is continuous from the ends of the drum 12' across the end sections 48' and 50' and into the center section 46'.

Figure 6:
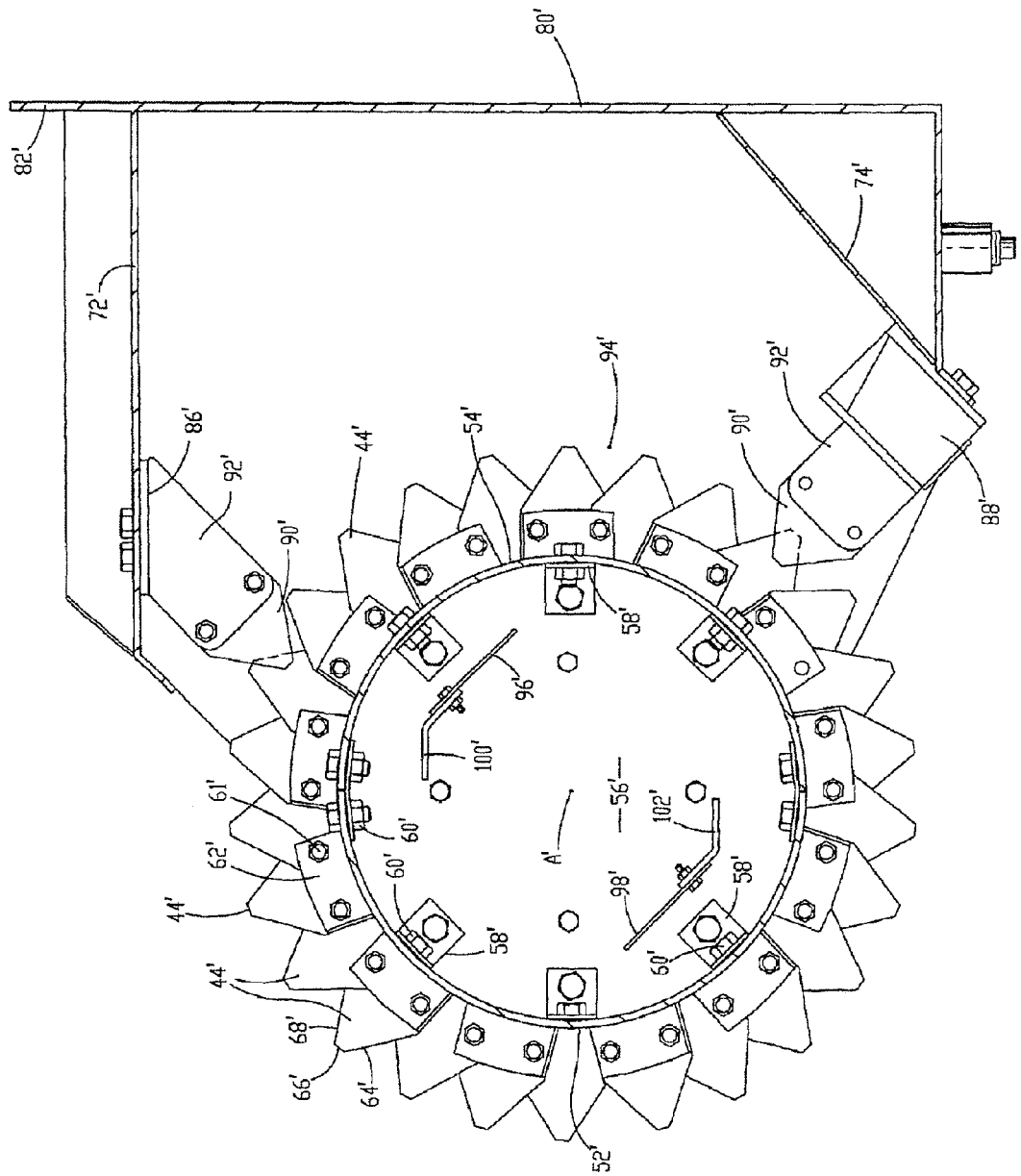
FIG. 6 is an enlarged vertical cross-sectional view of the prior art drum and shroud taken through line 6-6 of FIG. 4, showing the mounting relationship of the teeth assemblies on the drum, the upper and lower cutterbars and the respective teeth assemblies thereof, and adjacent the ends of the drum.
Figure 7:
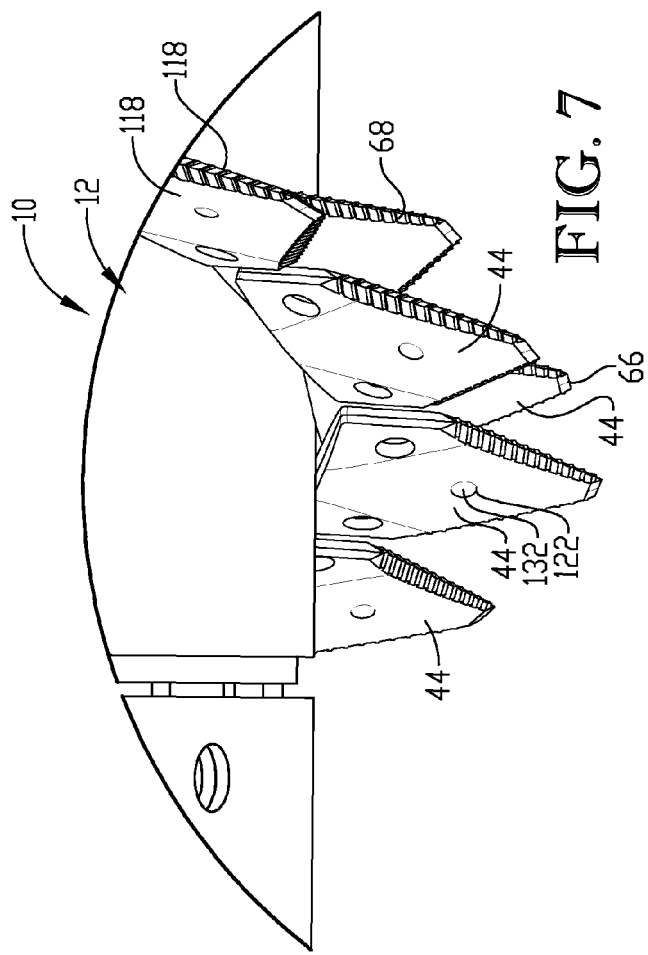
FIG. 7 is an enlarged, fragmentary view of an arrangement of teeth assemblies for drum teeth assemblies of an array of the present invention, with mounting plates and threaded fasteners removed for clarity.
Figure 11:
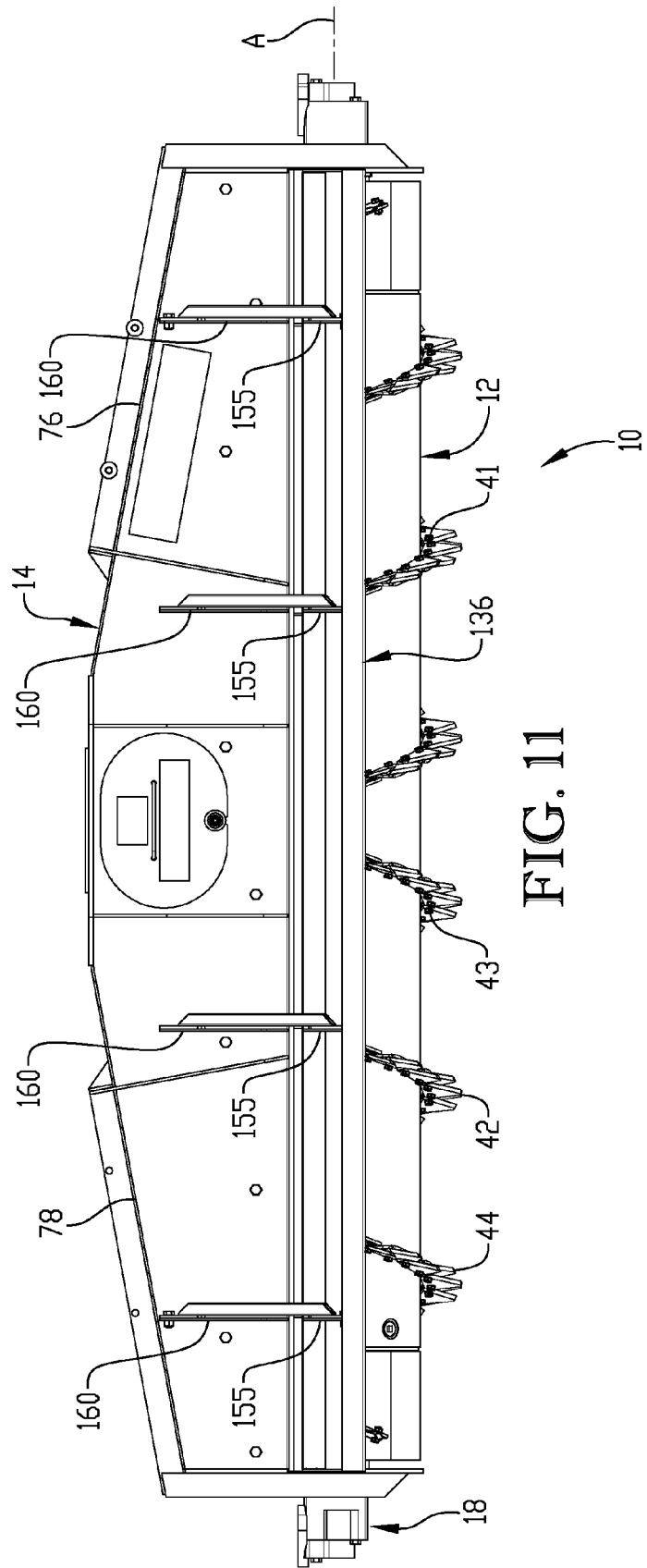
FIG. 11 is a top plan view of a cutterhead drum and shroud of the present invention including a shield mounted along and extending from a top edge of the cutterhead shroud.

The array 42' includes two convergent helically oriented flights 41' and 43' of mounting plates 62' which are welded to the drum surface 40'. The mounting plates 62' are spirally arrayed as shown in FIGS. 3 and 4 to provide a toothed cutting surface across virtually the entire width of the drum 12' when teeth assemblies 44' are mounted to the plates 62'. Each of the teeth assemblies 44' is mounted by two bolts into nuts 61' positioned on the opposite sides of the plates 62', so that every other of the teeth assemblies 44' spans two plates 62', as best seen in FIG. 6. Each of the teeth assemblies 44' has a cutting margin which may include a leading cutting edge 64', a tip 66', and a trailing cutting edge 68', which features are also seen in FIG. 7, although the motor 18' is preferably a reversible hydraulic motor which permits clearing of the teeth assemblies 44' by backwards rotation when necessary. In normal rotation of the drum 12', the array 42' converges to an apex 69' to effectively auger the cut and dredged material toward the center of the drum 12'.

As best seen in FIGS. 3, 5 and 6, the shroud 14' includes a pair of opposed end panels 68' and 70' for supporting drum mounting structure 16', upper and lower walls 72' and 74' respectively, angled walls 76' and 78' and back wall 80', all preferably of steel plate. The back wall 80' presents a facing 82' which extends normally above the upper wall 72'. A port 84' is centrally located in the back wall and presents a plurality of surrounding holes to facilitate mounting to the pump 30'.

Stationary cutterbars 86' and 88' are mounted to the upper and lower walls 72' and 74' respectively, and are best seen in FIGS. 5 and 6. Each cutter bar 86' and 88' presents a plurality of cutterbar teeth assemblies 90' which are configured substantially the same as the teeth assemblies 44' which are parts of the array 42', and mount to upstanding flanges 92' on each stationary cutterbar 86', 88' by bolts threaded onto nuts on the other side of the flanges. The spacing of the flanges 92' of each cutterbar 86' and 88', and therefore the teeth assemblies 90' carried thereby, is staggered whereby the cutterbar teeth assemblies 90' on cutterbar 86' are not vertically aligned with the corresponding cutterbar teeth assemblies 90' on cutterbar 88'. However, the alignment of the cutterbar teeth assemblies 90' corresponds to gaps 94' between the teeth assemblies 44' of the array 42' on the drum 12', whereby the slight transverse space between the teeth assemblies 44' receives the substantially fore and aft aligned teeth assemblies 90' of the stationary cutterbars 86' and 88', with the distance between the drum teeth assemblies 44' and the cutterbar teeth assemblies 90' being preferably about ½" at the closest point of approach to yield good cleaning and tearing action during rotation. In order to facilitate access to the teeth assemblies 90' for maintenance by providing adequate spacing therebetween, not every gap 94' receives one of the teeth assemblies 90' therebetween, but in the preferred embodiment shown, approximately two out of every three gaps 94' will receive a teeth assembly 90' therebetween to provide a tearing relationship between the teeth assemblies 90' of the cutterbars 86' and 88' and the teeth assemblies 44' for cutting, writhing and rending any vegetation which wraps around the drum or drapes across the teeth assemblies 44' or teeth assemblies 90'.

The shroud 14' additionally may optionally mount guard teeth assemblies 96' and 98', which are bolted to ear plates 100' and 102' respectively at each end panel 68' and 70' respectively. The guard teeth assemblies 96' and 98', as seen in FIG. 4, present cutting edges 104' which are pointed outwardly relative to the axis of rotation A of the drum 12', and are positioned radially outside the drum mounting structure 16' but radially interior to the end sections 48' and 50'. The guard teeth assemblies 96' and 98', when employed, may be located proximate the end panels of the shroud to cut vegetation which passes through the space defined between the longitudinal margins 106' and 108' of the drum and the end panels 68' and 70' respectively of the shroud 14' before such vegetation passes longitudinally toward to the center of the drum 12' and wraps around the drum mounting structure 16'.

As best seen in FIG. 5, the drum mounting structure 16' is largely conventional and includes hub 110' which permits rotation between the shroud 14' and the drum 12'. The hub 110' is bolted to the end panel 70' and to the end wall 56' at one end of the center section of the drum 12'. Another hub 112' rigidly connects the motor 18' and the center section 46', and is bolted to the end wall 56' and the motor 18'. In turn, the motor 18' is rigidly bolted to the end panel 68' and is preferably a reversible hydraulic motor which enables reversing of the drum 12' to clear any rocks, stumps or other large objects stuck between teeth assemblies 44' or teeth assemblies 90'. The motor 18' is driven by hydraulic fluid supplied under pressure and delivered through conduits 36' and 38'. Hubs 110' and 112', as well as guard teeth assemblies 96' and 98' are located in open-ended cavities 114' and 116' positioned outboard of end walls 56' and radially interior to end sections 48' and 50'.

Figure 8:
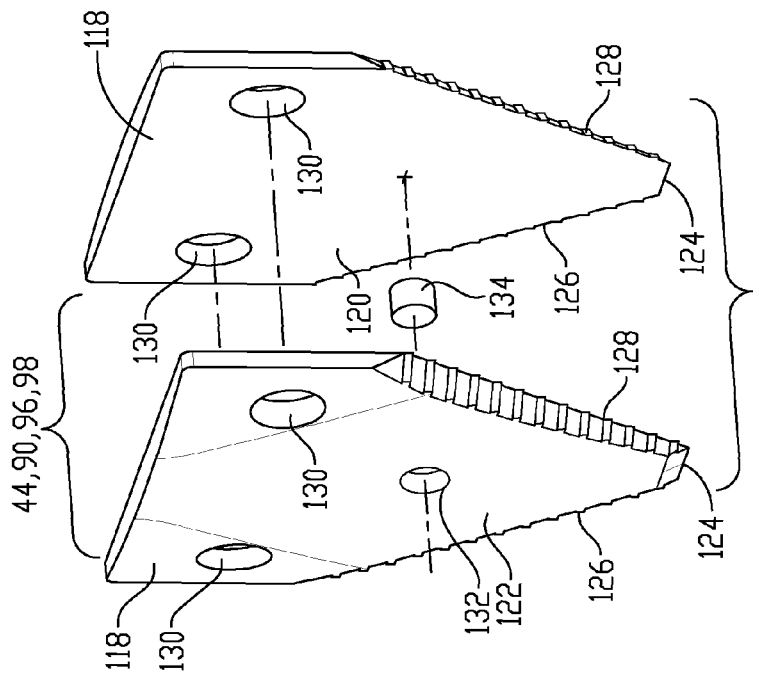
FIG. 8 is an enlarged exploded view of one of the teeth assemblies as used for the drum teeth assemblies of the present invention, for the first and second cutterbar teeth assemblies, and for the guard teeth assemblies, showing the individual teeth which may be bolted to the drum mounting plates, flanges or ear plates, showing the serrated cutting edges and a plug weld further joining the individual teeth.

Turning now to FIGS. 7-10, drum teeth assemblies 44, cutterhead teeth assemblies 90, and guard teeth assemblies 96 and 98 constructed in accordance with embodiments of the present invention are shown in detail. It will be understood that aspects of the present invention may be used in conjunction with prior art features shown in FIGS. 1-6. Each of the teeth assemblies 44, 90, 96 and 98 may include a pair of individual teeth 118 which beneficially are common to each of the teeth assemblies 44, 90, 96 and 98 to reduce the number of parts which must be maintained in inventory. Thus, the exploded view of FIG. 8 shows the same individual teeth 118 which are used in each of the teeth assemblies 44, 90, 96 and 98 and which are mounted to the respective mounting plates 62, flanges 92, and ear plates 100, 102. The individual teeth 118 may be provided with a substantially flat back side 120 and a raised or somewhat convex front side 122, and have a point 124 upon which converge two serrated cutting edges 126 and 128. Holes 130 are provided on each of the individual teeth 118 and aligned in registry when combined in back-to-back relationship in the teeth assemblies to permit bolts 136 to pass therethrough for mounting purposes. Thus, when the individual teeth 118 are placed back to back and secured together by threaded fasteners such as bolts and nuts or the like, they may comprise teeth assemblies 44, 90, 96 and 98, which assemblies each may have a leading cutting edge 64, a tip 66, and a trailing cutting edge 68. As may be seen in FIGS. 7 through 10, and especially in the exploded view FIG. 8, the individual teeth 118 of each of the teeth assemblies are plug welded together. A hole 132 is provided, for example by drilling, at least part way (e.g., approximately ¼ inch) through approximately the center of one or both of the teeth 118. The teeth 118 so drilled are placed in back to back relationship with their holes 130 in registry, and then plug welded such that a plug 134 is positioned and secured in the hole 132, thereby further securely fixing the teeth 118 in the teeth assemblies 44, 90, 96 and 98. By this arrangement and configuration involving back-to-back placement of the individual teeth 118 with the raised or convex surface exteriors facing outwardly and the flat back surfaces 120 together, the teeth assemblies 44, 90, 96 and 98 are not only substantially strengthened against bending or breakage, but vegetation may also pass over the teeth assemblies after being more effectively cut by the serrated leading 64 or trailing 68 cutting edges. Moreover, it has been discovered that the use of plug welding to connect the individual teeth 118 of the teeth assemblies provides exceptional and surprising strength, providing lamination in the teeth assemblies so that the teeth assemblies last longer and avoid bending. Thus, such plug welded teeth assemblies 44, 90, 96 and 98 significantly enhance productivity during weed harvesting by reducing downtime which might otherwise be required to repair the cutterhead and replace broken or bent teeth or teeth assemblies.

Turning now to FIGS. 11-14, a cutterhead 10 may be provided with a shield 136 which is preferably adjustably mounted to the shroud 14 along or adjacent a top front edge 138 of the shroud 14. The shield 136 may preferably extend the width of the shroud 14, and may have a height which may be greater than the radius of the cylindrical drum 12 and most preferably greater than the radial distance from the axis of rotation of the drum 12 to the point 124 of the teeth 118 on the drum 12. The teeth may be either back to back teeth 118 as shown and described with reference to FIGS. 6-10 as teeth assemblies 44, 90, 96 and 98, or alternatively relatively thick individual teeth 118A as shown in FIG. 14, having serrated leading and trailing cutting edges.

The shield 136 may be fabricated of metal, such as aluminum or steel, and preferably presents a relatively flat, planar front panel 140 which thus resists collection of liquid and cut vegetation thereon, but rather deflects any such liquid or vegetation contacting the front panel 140. The shield 136 preferably includes a proximate margin 142, a remote margin 144, and left and right side margins 146 and 148 which are angled relative to the front panel 140 to provide rigidity and reinforcement. The remote margin 144 and side margins 146 and 148 may extend rearwardly of the front panel 140 and be angled approximately 90° from the front panel to enhance strength and rigidity, while the proximate margin 142 may be angled approximately 45° from the front panel to both enhance the strength and the range of pivotal adjustment of the shield 136 relative to the shroud 14. An inner proximate wall 150 oriented substantially perpendicular to the front panel 140 encloses the space within the proximate margin 142 to resist collection of cut vegetation and water therein. A plurality of tabs 152 extend from the proximate margin 142 and are laterally spaced along the width of the shield 136. The tabs 152 are positioned adjacent laterally spaced reinforcing bars 155 which preferably extend between the remote margin 144 and the inner proximate wall 150. The tabs 152 may have holes into which couplers 154 such as pivot pins, bolts or other threaded fasteners are received to pivotally mount the shield 136 to the shroud 14.

In order to most advantageously mount the shield 136, a mounting bar 156 may extend along the top front edge 138 of the shroud 14. The mounting bar 156 may carry a plurality of generally forwardly and/or upwardly extending mounting flanges 158 which have holes complementarily sized and positioned relative to the holes in the tabs 152 for receiving the couplers 154 therethrough. Thus, the shield may swing about the couplers 154 for positioning on one of a plurality of preselected desired orientations.

Figure 13:
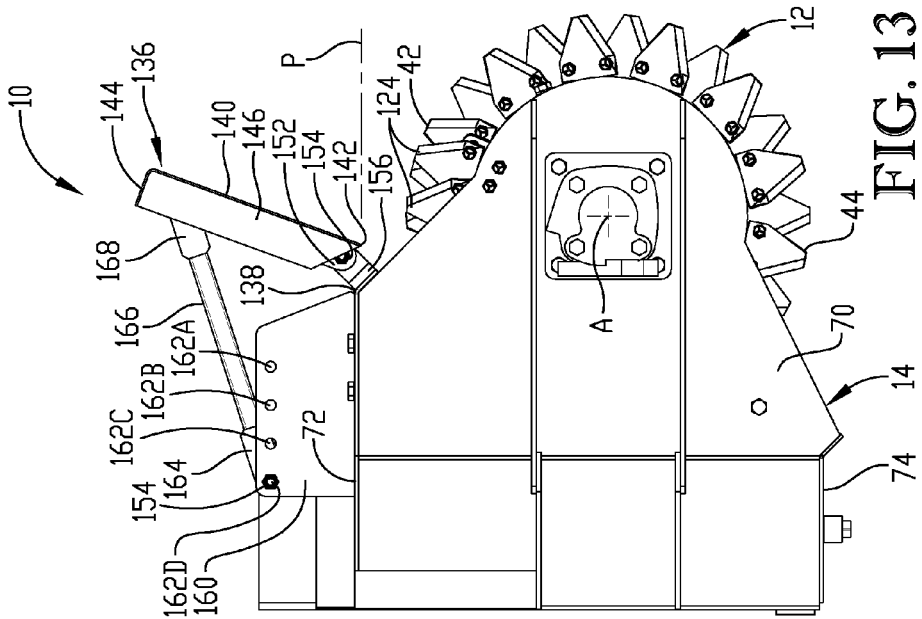
FIG. 13 is an enlarged right side elevational view of the cutterhead shown in FIG. 11, showing the positioning of the shield relative to the top front edge of the shroud and the rotating drum.
Figure 12:
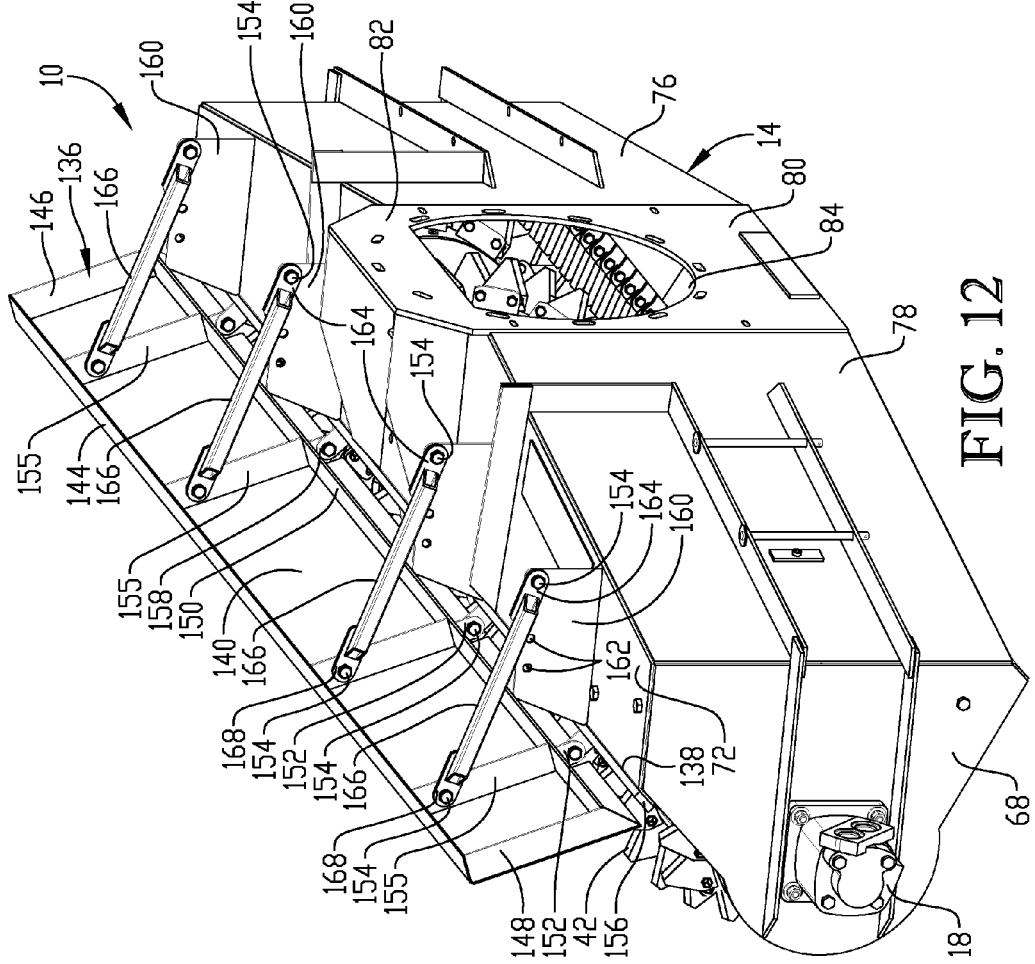
FIG. 12 is an enlarged left top rear perspective view of the cutterhead shown in FIG. 11, showing the positioning of the shield in a generally upright orientation and the brackets for adjustably mounting the shield to the cutterhead shroud, and further showing the port through the shroud.

A plane P extends forwardly from the upper wall 72 of the shroud 14, which in FIG. 13 is generally flat, and thus the plane lies along the flat upper surface of the upper wall 72. Brackets 160 may be laterally spaced along the upper wall 72 of the shroud 14. The brackets 160 are generally oriented fore-and-aft along upper wall 72, and are preferably positioned in planes generally perpendicular to both plane P and the axis A of rotation of the drum 12. Each of the brackets 160 may include a series of fore-and-aft spaced holes 162, four such holes 162 being illustrated on each of the brackets 160 in the drawing of FIGS. 12 and 13. The holes 162 are positioned and configured to mount a proximate end 164 of struts 166 by the use of couplers 154, such that each of the holes 162 (i.e., 162A, 162B, 162C and 162D) on a bracket 160 provides an alternate mounting location. The struts 166 are also provided with a remote end 168, which is pivotally mounted by couplers 154 to a hole in a respective one of the reinforcing bars 155. By removing the couplers 154 from the proximate ends 164 of the struts 166 and repositioning the holes through proximate ends 164 of the struts 166 in alignment with a different one of the holes 162 of a bracket 160 and then reattaching the couplers 154, the angle of the front panel 140 relative to the plane P along the surface of the upper wall 72 may be adjusted. For example, FIG. 13 shows the proximate ends 164 of struts 166 attached in the rearmost hole 162D of the bracket 160, whereby the front panel 140 of the shield 136 is oriented at about 70° from the plane P. However, by removing the couplers 154, pivoting the shield forwardly (clockwise as depicted in FIG. 13) about a pivot axis defined by the holes in the tabs 152 and the couplers 154 passing therethrough, the angle may be adjusted and maintained by reattaching the proximate ends 164 of the struts 166 to the brackets 160 by securing the couplers 154 through either hole 162C, 162B or 162A. When the frontmost hole 162A is used, the angle may be reduced to about 10°. By lengthening the brackets 160 or providing additional holes 162, additional preselected angles for pivoting the shield 136 may be provided.

In preparation for use of the cutterhead 10, the shroud 14 is bolted to the pump 30, the conduits 36 and 38 are connected to the hydraulic pump in the engine housing, and the boom 28 is lowered by the operator in the cab to begin dredging. Any aquatic vegetation encountered during dredging is severed and cut by the cutting action of the teeth assemblies 44 while the drum 12 rotates, and further enhanced by the tearing action between the cutterhead teeth assemblies 90 mounted on the stationary cutterbars when teeth 44 pass thereby. In addition, when guard teeth assemblies 96 and 98 are employed, additional cutting action is presented for cutting or tearing vegetation which passes between the longitudinal margins 106 and 108 of the drum and the end panels 68 and 70 of the shroud 14, preventing such vegetation from passing longitudinally toward the center of the drum 12 and wrapping around the drum mounting structure 16. The teeth assemblies 44 present a cutting surface which may extend transversely across substantially the entire length of the drum 12, and thus any vegetation passing across the path of the drum 12 will be engaged by one or more of the teeth assemblies 44. As noted, except for the teeth assemblies 44, the drum 12 presents a substantially smooth surface which inhibits the ability of any vegetation to cling to the drum and become draped across it, thereby accumulating and fouling the cutterhead 10.

The array 42 of teeth assemblies 44 acts further as an auger to move any dredged sediment and cut vegetation to the center of the drum 12 and thus immediately proximate the port 84 for passage into the pump 30. The cutterhead 10 chops the vegetation into small enough pieces to avoid jamming the pump 30, and thus the cut vegetation and the sediment or other deposits can be effectively dredged. Many types of aquatic vegetation including floating plants like hyacinth, submerged vegetation such as milfoil and hydrilla, and emergent vegetation such as cattail and small willows can be cut and removed using the cutterhead 10 hereof, as well as aquatic plants sometimes called tussiks. As in conventional dredging practice, the boom 28 is raised or lowered by a winch mounted on the dredge 20 to engage the vegetation and sediment or other deposits to the desired depth, and the dredge 20 may be self-powered or positioned by shore-anchored cables to direct the cutterhead 10 laterally into position. The angle of the shield 136 relative to the plane P of the top wall 72 of the cutterhead shroud 14 may be adjusted as desired according to whether the cutterhead is to be operated at a depth or along the surface of the body of water in which the vegetation to be harvested is located. The shield 136 may also be adjusted as desired with respect to its relative orientation to the top wall 72 based on the type of vegetation being cut and how the vegetation may thus most effectively be fed into the shroud 14.

Although preferred forms of the invention have been described above, it is to be recognized that such disclosure is by way of illustration only, and should not be utilized in a limiting sense in interpreting the scope of the present invention. Obvious modifications to the exemplary embodiments, as hereinabove set forth, could be readily made by those skilled in the art without departing from the spirit of the present invention.

The inventors hereby state their intent to rely on the Doctrine of Equivalents to determine and assess the reasonably fair scope of their invention as pertains to any apparatus not materially departing from but outside the liberal scope of the invention as set out in the following claims.

The invention claimed is:

1. An apparatus for cutting aquatic vegetation, the apparatus comprising:
    a first stationary cutterbar presenting a first set of spaced-apart cutterbar teeth assemblies mounted therealong;
    a second stationary cutterbar presenting a second set of spaced-apart cutterbar teeth assemblies mounted therealong;
    a cutterhead shroud mounting said first and second stationary cutterbars;
    a drum rotatably mounted proximate said cutterhead shroud, said drum presenting a substantially smooth drum surface and presenting a plurality of radially projecting drum teeth assemblies therealong;
    means rotatably mounting said drum proximate said cutterheads; and
    means mounting said drum teeth assemblies to present gaps therebetween whereby some of said drum teeth assemblies pass closely adjacent said first set of cutterbar teeth assemblies in tearing relationship thereto and others of said drum teeth assemblies pass closely adjacent said second set of cutterbar teeth assemblies, in tearing relationship thereto, during rotation of said drum,
    wherein the drum teeth assemblies include a first tooth and a second tooth, each of the teeth having a flat back, a raised front and a cutting margin, the first and second teeth being mounted in back-to-back arrangement whereby their cutting margins are adjacent and the backs are substantially co-planar.

2. An apparatus as set forth in claim 1, wherein at least some of said drum teeth assemblies are oriented obliquely to a plane normal to the axis of rotation of said drum.

3. An apparatus as set forth in claim 2, wherein at least some of said cutterbar teeth assemblies are oriented in spaced relationship in alignment with the plane normal to the axis of rotation of said drum.

4. An apparatus as set forth in claim 1, wherein said drum teeth assemblies are presented in a helically oriented array across at least a part of said drum.

5. An apparatus as set forth in claim 1, wherein said drum teeth assemblies are positioned in an array extending substantially the longitudinal length of said drum to present a substantially continuous cutting edge extending along the longitudinal length of said drum.

6. An apparatus as set forth in claim 5, wherein each of said drum teeth assemblies are positioned in overlapping relationship to the drum teeth assembly next adjacent thereto.

7. An apparatus as set forth in claim 1, wherein said drum teeth assemblies are coupled to said drum by threaded fasteners.

8. An apparatus as set forth in claim 1, wherein the first and second teeth of at least one drum tooth assembly are connected by a weld.

9. An apparatus as set forth in claim 8, wherein said weld is a plug weld.

10. An apparatus as set forth in claim 1, wherein said drum is substantially cylindrical and presents longitudinally spaced ends having open-ended cavities radially interior to said drum surface at each end of said drum.

11. An apparatus as set forth in claim 10, including at least one radially outwardly projecting teeth assembly positioned in each of said cavities for cutting vegetation passing between said shroud and said drum ends.

12. An apparatus as set forth in claim 1, wherein the cutting margin of the first and second teeth of at least one drum tooth assembly is serrated.

13. An apparatus as set forth in claim 1, wherein the teeth assemblies of said first set of spaced-apart cutterbar teeth assemblies include a first tooth and a second tooth, each of the teeth having a flat back, a raised front and a cutting margin, the first and second teeth being mounted in back-to-back arrangement whereby their cutting margins are adjacent and the backs are substantially co-planar.

14. An apparatus as set forth in claim 13, wherein the cutting margin of the first and second teeth of at least one of the teeth assemblies of the first set of cutterbar teeth assemblies is serrated.

15. An apparatus as set forth in claim 14, wherein the teeth assemblies of said second set of spaced-apart cutterbar teeth assemblies include a first tooth and a second tooth, each of the teeth having a flat back, a raised front and a cutting margin, the first and second teeth being mounted in back-to-back arrangement whereby their cutting margins are adjacent and the backs are substantially co-planar.

16. An apparatus as set forth in claim 15, wherein the cutting margin of the first and second teeth of at least one of the teeth assemblies of the second set of cutterbar teeth assemblies is serrated.

17. An apparatus as set forth in claim 1, further including a shield mounted to said cutterhead shroud and extending forwardly and/or upwardly from a top front edge of said cutterhead shroud.

18. An apparatus as set forth in claim 17, wherein said shield is mounted adjacent said top front edge of said cutterhead shroud.

19. An apparatus as set forth in claim 17, including a mounting assembly adjustably mounting said shield to said cutterhead shroud.

20. An apparatus as set forth in claim 19, wherein said mounting assembly includes a plurality of brackets on a top wall of said cutterhead shroud and a plurality of struts mounted to respective ones of said brackets and to said shield.

21. An apparatus as set forth in claim 20, wherein each of said brackets includes a plurality of spaced apart holes configured and positioned for alternatively receiving a coupler connecting one of said struts to one of said brackets.

22. An apparatus for cutting aquatic vegetation, the apparatus comprising:
a cutterhead shroud presenting a port for passing cut vegetation therethrough;
a drum;
means mounting said drum for rotation relative to said shroud;
a motor for rotating said drum; and
an array of drum teeth assemblies projecting radially from said drum, said array being of a substantially helical configuration about said drum for promoting movement of the cut vegetation to said port during rotation of said drum,
wherein the drum teeth assemblies include a first tooth and a second tooth, each of the teeth having a flat back, a raised front and a cutting margin, the first and second teeth being mounted in back-to-back arrangement whereby their cutting margins are adjacent and the backs are substantially co-planar.

23. An apparatus as set forth in claim 22, wherein said shroud presents two opposed end panels, said port being located substantially equidistant between said end panels.

24. An apparatus as set forth in claim 22, wherein said array comprises two substantially helical and convergent flights of drum teeth assemblies.

25. An apparatus as set forth in claim 22, including threaded fasteners for removably attaching said drum teeth assemblies to said drum.

26. An apparatus as set forth in claim 22, wherein said array extends substantially the longitudinal length of said drum to present a substantially continuous cutting edge extending along the longitudinal length of said drum.

27. An apparatus as set forth in claim 26, wherein each of said drum teeth assemblies are positioned in overlapping relationship to the drum teeth assembly next adjacent thereto.

28. An apparatus as set forth in claim 22, wherein said drum is substantially cylindrical and presents longitudinally spaced ends having open-ended cavities radially interior to said drum surface at each end of said drum.

29. An apparatus as set forth in claim 22, including at least one radially outwardly projecting teeth assembly positioned in each of said cavities for cutting vegetation passing between said shroud and said drum ends.

30. An apparatus as set forth in claim 22, wherein the cutting margin of the first and second teeth of at least one drum tooth assembly is serrated.

31. An apparatus as set forth in claim 30, wherein the first and second teeth of at least one drum tooth assembly are joined by a weld.

32. An apparatus as set forth in claim 31, wherein said weld is a plug weld.

33. An apparatus as set forth in claim 22, further including a first stationary cutterbar mounted to the cutterhead shroud presenting a first set of spaced-apart cutterbar teeth assemblies mounted therealong, and a second stationary cutterbar mounted to the cutterhead shroud presenting a second set of spaced-apart cutterbar teeth assemblies mounted therealong, wherein the teeth assemblies of the said first set of spaced-apart cutterbar teeth assemblies includes a first tooth and a second tooth, each of the teeth having a flat back, a raised front and a cutting margin, the first and second teeth being mounted in back-to-back arrangement whereby their cutting margins are adjacent and the backs are substantially co-planar.

34. An apparatus as set forth in claim 33, wherein the cutting margin of the first and second teeth of at least one of the first set of cutterbar teeth assemblies is serrated.

35. An apparatus as set forth in claim 33, wherein the teeth assemblies of the said second set of spaced-apart cutterbar teeth assemblies includes a first tooth and a second tooth, each of the teeth having a flat back, a raised front and a cutting margin, the first and second teeth being mounted in back-to-back arrangement whereby their cutting margins are adjacent and the backs are substantially co-planar.

36. An apparatus as set forth in claim 35, wherein the cutting margin of the first and second teeth of at least one of the second set of cutterbar teeth assemblies is serrated.

37. An apparatus for cutting aquatic vegetation, the apparatus comprising:
a first stationary cutterbar presenting a first set of spaced-apart cutterbar teeth assemblies mounted therealong;
a second stationary cutterbar presenting a second set of spaced-apart cutterbar teeth assemblies mounted therealong;
a cutterhead shroud mounting said first and second stationary cutterbars;
a drum rotatably mounted proximate said cutterhead shroud, said drum presenting a substantially smooth drum surface and presenting a plurality of radially projecting drum teeth assemblies therealong;
means rotatably mounting said drum proximate said cutterheads;
means mounting said drum teeth assemblies to present gaps therebetween whereby some of said drum teeth assemblies pass closely adjacent said first set of cutterbar teeth assemblies in tearing relationship thereto and others of said drum teeth assemblies pass closely adjacent said second set of cutterbar teeth assemblies, in tearing relationship thereto, during rotation of said drum; and
a shield mounted to said cutterhead shroud and extending forwardly and upwardly from a top front edge of said cutterhead shroud.

38. An apparatus as set forth in claim 37, wherein said shield is mounted adjacent said top front edge of said cutterhead shroud.

39. An apparatus as set forth in claim 37, including a mounting assembly adjustably mounting said shield to said cutterhead shroud.

40. An apparatus as set forth in claim 39, wherein said mounting assembly includes a plurality of brackets on a top wall of said cutterhead shroud and a plurality of struts mounted to respective ones of said brackets and to said shield.

41. An apparatus as set forth in claim 40, wherein each of said brackets include a plurality of spaced apart holes configured and positioned for alternatively receiving a coupler connecting a respective strut to said bracket.

42. A method of cutting aquatic vegetation, the method comprising the steps of:
providing a dredge including a pump and means for conveying cut vegetation from said pump, said pump mounting a cutterhead having a shroud and a drum, said drum presenting a substantially helical array of drum teeth assemblies, said teeth assemblies including a first tooth and a second tooth, each of the teeth having a flat back, a raised front and a cutting margin, the first and second teeth being mounted in back-to-back arrangement whereby their cutting margins are adjacent and the backs are substantially co-planar, said shroud presenting at least one stationary cutterbar presenting a plurality of cutterbar teeth assemblies, at least some of said cutterbar teeth assemblies being oriented in vegetation tearing relationship to said drum when said drum is rotated relative to said shroud, said shroud further including a port for passing cut vegetation to said pump;

placing said cutterhead in engagement with aquatic vegetation;

rotating said drum to cut said vegetation;

moving said vegetation transversely along said drum by augering action of said helical array of teeth; and passing said vegetation through said port and into said pump.

43. A method of cutting aquatic vegetation, the method comprising the steps of:

providing a dredge including a pump and means for conveying cut vegetation from said pump, said pump mounting a cutterhead having a shroud and a drum, said drum presenting a substantially helical array of drum teeth assemblies, said shroud presenting at least one stationary cutterbar presenting a plurality of cutterbar teeth assemblies, at least some of said cutterbar teeth assemblies being oriented in vegetation tearing relationship to said drum when said drum is rotated relative to said shroud, said shroud further including a port for passing cut vegetation to said pump and a shield extending upwardly and/or forwardly of a top front edge of said shroud;

placing said cutterhead in engagement with aquatic vegetation;

rotating said drum to cut said vegetation;

moving said vegetation transversely along said drum by augering action of said helical array of teeth;

deflecting water and vegetation contacting said shield towards said rotating drum; and passing said vegetation through said port and into said pump.

* * * * *